(12) United States Patent
Tien et al.

(10) Patent No.: US 7,379,957 B2
(45) Date of Patent: May 27, 2008

(54) METHOD AND APPARATUS OF DEMODULATING SQUARE ROOT FOR PROCESSING DIGITAL SIGNALS

(75) Inventors: Shi-Ho Tien, Yanchao Township, Kaohsiung County (TW); Ching-Chun Meng, Longtan Township, Taoyuan County (TW); Yow-Ling Gau, Taipei Hsien (TW)

(73) Assignee: Chung Shan Institute of Science and Technology, Armaments Bureau, M.N.D., Taoyuan (TW)

( * ) Notice: Subject to any disclaimer, the term of this patent is extended or adjusted under 35 U.S.C. 154(b) by 721 days.

(21) Appl. No.: 10/857,047

(22) Filed: May 28, 2004

(65) Prior Publication Data

US 2005/0228843 A1 Oct. 13, 2005

(51) Int. Cl.
*G06F 7/38* (2006.01)
(52) U.S. Cl. ..................................................... 708/605
(58) Field of Classification Search ................. 708/605
See application file for complete search history.

(56) References Cited

U.S. PATENT DOCUMENTS

| | | | | |
|---|---|---|---|---|
| 4,599,701 A | * | 7/1986 | Vojir et al. ................. | 708/605 |
| 5,459,683 A | * | 10/1995 | Uesugi et al. ............... | 708/605 |
| 5,862,068 A | * | 1/1999 | Onodera ...................... | 708/605 |
| 6,070,181 A | * | 5/2000 | Yeh ............................. | 708/605 |
| 6,553,399 B1 | * | 4/2003 | Yeh et al. .................... | 708/605 |
| 6,658,445 B1 | * | 12/2003 | Gau et al. .................... | 708/605 |

\* cited by examiner

*Primary Examiner*—Tan V. Mai
(74) *Attorney, Agent, or Firm*—J.C. Patents

(57) ABSTRACT

A method of demodulating a square root for processing digital signals is disclosed. The demodulation includes the following steps. First, define $|\arg e|$ to be the larger one between the absolute value of two input values I and Q and define $|small|$ to be the smaller one between the absolute value of the two input values I and Q. Next, define a first determining form by the inequalities $16|small| \leq 16||\arg e| \leq 18|small|$ and $16||\arg e|=16|small|$. In addition, define a second determining form by the inequalities $16|small| \leq 16||\arg e| \leq 18|small|$ and $16||\arg e| \neq |small|$. When the relation between $|\arg e|$ and $|small|$ conforms to the first determining form, the approximate root-mean-square value of the two input values I and Q is $||\arg e|+2^{-5}||\arg e|$. When the relation between $|\arg e|$ and $|small|$ conforms to the second determining form, the approximate root-mean-square value of the two input values I and Q is $||\arg e|+2^{-6}||\arg e|$.

15 Claims, 7 Drawing Sheets

| Angle | $\sqrt{I^2+Q^2}$ | Approximate value | Error ratio | Angle | $\sqrt{I^2+Q^2}$ | Approximate value | Error ratio |
|---|---|---|---|---|---|---|---|
| 0.00 | 1.00000 | 1.00000 | 0.00000 | 45.00 | 1.00000 | 0.97227 | 2.77282 |
| 1.00 | 1.00000 | 0.99985 | 0.01523 | 46.00 | 1.00000 | 0.97675 | 2.32485 |
| 2.00 | 1.00000 | 0.99939 | 0.06092 | 47.00 | 1.00000 | 0.98093 | 1.90663 |
| 3.00 | 1.00000 | 0.99863 | 0.13705 | 48.00 | 1.00000 | 0.98482 | 1.51830 |
| 4.00 | 1.00000 | 0.99756 | 0.24359 | 49.00 | 1.00000 | 0.98840 | 1.15996 |
| 5.00 | 1.00000 | 0.99619 | 0.38053 | 50.00 | 1.00000 | 0.99168 | 0.83173 |
| 6.00 | 1.00000 | 0.99452 | 0.54781 | 51.00 | 1.00000 | 0.99466 | 0.53371 |
| 7.00 | 1.00000 | 0.99255 | 0.74538 | 52.00 | 1.00000 | 0.99734 | 0.26599 |
| 8.00 | 1.00000 | 0.99027 | 0.97319 | 53.00 | 1.00000 | 0.99971 | 0.02864 |
| 9.00 | 1.00000 | 0.98769 | 1.23117 | 54.00 | 1.00000 | 1.00178 | -0.17825 |
| 10.00 | 1.00000 | 0.98481 | 1.51922 | 55.00 | 1.00000 | 1.00355 | -0.35463 |
| 11.00 | 1.00000 | 0.98163 | 1.83728 | 56.00 | 1.00000 | 1.00500 | -0.50043 |
| 12.00 | 1.00000 | 0.97815 | 2.18524 | 57.00 | 1.00000 | 1.00616 | -0.61563 |
| 13.00 | 1.00000 | 0.97437 | 2.56299 | 58.00 | 1.00000 | 1.00700 | -0.70017 |
| 14.00 | 1.00000 | 0.97030 | 2.97043 | 59.00 | 1.00000 | 1.00754 | -0.75404 |
| 15.00 | 1.00000 | 0.97459 | 2.54054 | 60.00 | 1.00000 | 1.00777 | -0.77722 |
| 16.00 | 1.00000 | 0.97892 | 2.10773 | 61.00 | 1.00000 | 1.00770 | -0.76971 |
| 17.00 | 1.00000 | 0.98295 | 1.70475 | 62.00 | 1.00000 | 1.00731 | -0.73149 |
| 18.00 | 1.00000 | 0.98668 | 1.33171 | 63.00 | 1.00000 | 1.00663 | -0.66260 |
| 19.00 | 1.00000 | 0.99011 | 0.98872 | 64.00 | 1.00000 | 1.00563 | -0.56304 |
| 20.00 | 1.00000 | 0.99324 | 0.67589 | 65.00 | 1.00000 | 1.00433 | -0.43284 |
| 21.00 | 1.00000 | 0.99607 | 0.39332 | 66.00 | 1.00000 | 1.00272 | -0.27206 |
| 22.00 | 1.00000 | 0.99859 | 0.14108 | 67.00 | 1.00000 | 1.00081 | -0.08073 |
| 23.00 | 1.00000 | 1.00081 | -0.08073 | 68.00 | 1.00000 | 0.99859 | 0.14108 |
| 24.00 | 1.00000 | 1.00272 | -0.27206 | 69.00 | 1.00000 | 0.99607 | 0.39332 |
| 25.00 | 1.00000 | 1.00433 | -0.43284 | 70.00 | 1.00000 | 0.99324 | 0.67589 |
| 26.00 | 1.00000 | 1.00563 | -0.56304 | 71.00 | 1.00000 | 0.99011 | 0.98872 |
| 27.00 | 1.00000 | 1.00663 | -0.66260 | 72.00 | 1.00000 | 0.98668 | 1.33171 |
| 28.00 | 1.00000 | 1.00731 | -0.73149 | 73.00 | 1.00000 | 0.98295 | 1.70475 |
| 29.00 | 1.00000 | 1.00770 | -0.76971 | 74.00 | 1.00000 | 0.97892 | 2.10773 |
| 30.00 | 1.00000 | 1.00777 | -0.77722 | 75.00 | 1.00000 | 0.97459 | 2.54054 |
| 31.00 | 1.00000 | 1.00754 | -0.75404 | 76.00 | 1.00000 | 0.96997 | 3.00303 |
| 32.00 | 1.00000 | 1.00700 | -0.70017 | 77.00 | 1.00000 | 0.97437 | 2.56299 |
| 33.00 | 1.00000 | 1.00616 | -0.61563 | 78.00 | 1.00000 | 0.97815 | 2.18524 |
| 34.00 | 1.00000 | 1.00500 | -0.50043 | 79.00 | 1.00000 | 0.98163 | 1.83728 |
| 35.00 | 1.00000 | 1.00355 | -0.35463 | 80.00 | 1.00000 | 0.98481 | 1.51922 |
| 36.00 | 1.00000 | 1.00178 | -0.17825 | 81.00 | 1.00000 | 0.98769 | 1.23117 |
| 37.00 | 1.00000 | 0.99971 | 0.02864 | 82.00 | 1.00000 | 0.99027 | 0.97319 |
| 38.00 | 1.00000 | 0.99734 | 0.26599 | 83.00 | 1.00000 | 0.99255 | 0.74538 |
| 39.00 | 1.00000 | 0.99466 | 0.53371 | 84.00 | 1.00000 | 0.99452 | 0.54781 |
| 40.00 | 1.00000 | 0.99168 | 0.83173 | 85.00 | 1.00000 | 0.99619 | 0.38053 |
| 41.00 | 1.00000 | 0.98840 | 1.15996 | 86.00 | 1.00000 | 0.99756 | 0.24359 |
| 42.00 | 1.00000 | 0.98482 | 1.51830 | 87.00 | 1.00000 | 0.99863 | 0.13705 |
| 43.00 | 1.00000 | 0.98093 | 1.90663 | 88.00 | 1.00000 | 0.99939 | 0.06092 |
| 44.00 | 1.00000 | 0.97675 | 2.32485 | 89.00 | 1.00000 | 0.99985 | 0.01523 |

Fig. 1

| Angle | $\sqrt{I^2+Q^2}$ | Approximate value | Error ratio | Angle | $\sqrt{I^2+Q^2}$ | Approximate value | Error ratio |
|---|---|---|---|---|---|---|---|
| 0.00 | 1.00000 | 1.00000 | 0.00000 | 45.00 | 1.00000 | 1.00266 | -0.26553 |
| 1.00 | 1.00000 | 0.99985 | 0.01523 | 46.00 | 1.00000 | 1.00727 | -0.72750 |
| 2.00 | 1.00000 | 0.99939 | 0.06092 | 47.00 | 1.00000 | 0.99624 | 0.37638 |
| 3.00 | 1.00000 | 0.99863 | 0.13705 | 48.00 | 1.00000 | 1.00018 | -0.01802 |
| 4.00 | 1.00000 | 0.99756 | 0.24359 | 49.00 | 1.00000 | 1.00382 | -0.38194 |
| 5.00 | 1.00000 | 0.99619 | 0.38053 | 50.00 | 1.00000 | 0.99168 | 0.83173 |
| 6.00 | 1.00000 | 0.99452 | 0.54781 | 51.00 | 1.00000 | 0.99466 | 0.53371 |
| 7.00 | 1.00000 | 1.00803 | -0.80299 | 52.00 | 1.00000 | 0.99734 | 0.26599 |
| 8.00 | 1.00000 | 1.00572 | -0.57163 | 53.00 | 1.00000 | 0.99971 | 0.02864 |
| 9.00 | 1.00000 | 1.00310 | -0.30963 | 54.00 | 1.00000 | 1.00178 | -0.17825 |
| 10.00 | 1.00000 | 1.00017 | -0.01708 | 55.00 | 1.00000 | 1.00355 | -0.35463 |
| 11.00 | 1.00000 | 0.99694 | 0.30594 | 56.00 | 1.00000 | 1.00500 | -0.50043 |
| 12.00 | 1.00000 | 0.99341 | 0.65933 | 57.00 | 1.00000 | 1.00616 | -0.61563 |
| 13.00 | 1.00000 | 1.00482 | -0.48191 | 58.00 | 1.00000 | 1.00700 | -0.70017 |
| 14.00 | 1.00000 | 1.00062 | -0.06175 | 59.00 | 1.00000 | 1.00754 | -0.75404 |
| 15.00 | 1.00000 | 0.98980 | 1.02017 | 60.00 | 1.00000 | 1.00777 | -0.77722 |
| 16.00 | 1.00000 | 0.99419 | 0.58061 | 61.00 | 1.00000 | 1.00770 | -0.76971 |
| 17.00 | 1.00000 | 0.99829 | 0.17134 | 62.00 | 1.00000 | 1.00731 | -0.73149 |
| 18.00 | 1.00000 | 1.00208 | -0.20752 | 63.00 | 1.00000 | 1.00663 | -0.66260 |
| 19.00 | 1.00000 | 1.00556 | -0.55586 | 64.00 | 1.00000 | 1.00563 | -0.56304 |
| 20.00 | 1.00000 | 0.99324 | 0.67589 | 65.00 | 1.00000 | 1.00433 | -0.43284 |
| 21.00 | 1.00000 | 0.99607 | 0.39332 | 66.00 | 1.00000 | 1.00272 | -0.27206 |
| 22.00 | 1.00000 | 0.99859 | 0.14108 | 67.00 | 1.00000 | 1.00081 | -0.08073 |
| 23.00 | 1.00000 | 1.00081 | -0.08073 | 68.00 | 1.00000 | 0.99859 | 0.14108 |
| 24.00 | 1.00000 | 1.00272 | -0.27206 | 69.00 | 1.00000 | 0.99607 | 0.39332 |
| 25.00 | 1.00000 | 1.00433 | -0.43284 | 70.00 | 1.00000 | 0.99324 | 0.67589 |
| 26.00 | 1.00000 | 1.00563 | -0.56304 | 71.00 | 1.00000 | 1.00556 | -0.55586 |
| 27.00 | 1.00000 | 1.00663 | -0.66260 | 72.00 | 1.00000 | 1.00208 | -0.20752 |
| 28.00 | 1.00000 | 1.00731 | -0.73149 | 73.00 | 1.00000 | 0.99829 | 0.17134 |
| 29.00 | 1.00000 | 1.00770 | -0.76971 | 74.00 | 1.00000 | 0.99419 | 0.58061 |
| 30.00 | 1.00000 | 1.00777 | -0.77722 | 75.00 | 1.00000 | 0.98980 | 1.02017 |
| 31.00 | 1.00000 | 1.00754 | -0.75404 | 76.00 | 1.00000 | 1.00028 | -0.02813 |
| 32.00 | 1.00000 | 1.00700 | -0.70017 | 77.00 | 1.00000 | 1.00482 | -0.48191 |
| 33.00 | 1.00000 | 1.00616 | -0.61563 | 78.00 | 1.00000 | 0.99341 | 0.65933 |
| 34.00 | 1.00000 | 1.00500 | -0.50043 | 79.00 | 1.00000 | 0.99694 | 0.30594 |
| 35.00 | 1.00000 | 1.00355 | -0.35463 | 80.00 | 1.00000 | 1.00017 | -0.01708 |
| 36.00 | 1.00000 | 1.00178 | -0.17825 | 81.00 | 1.00000 | 1.00310 | -0.30963 |
| 37.00 | 1.00000 | 0.99971 | 0.02864 | 82.00 | 1.00000 | 1.00572 | -0.57163 |
| 38.00 | 1.00000 | 0.99734 | 0.26599 | 83.00 | 1.00000 | 1.00803 | -0.80299 |
| 39.00 | 1.00000 | 0.99466 | 0.53371 | 84.00 | 1.00000 | 0.99452 | 0.54781 |
| 40.00 | 1.00000 | 0.99168 | 0.83173 | 85.00 | 1.00000 | 0.99619 | 0.38053 |
| 41.00 | 1.00000 | 1.00382 | -0.38194 | 86.00 | 1.00000 | 0.99756 | 0.24359 |
| 42.00 | 1.00000 | 1.00018 | -0.01802 | 87.00 | 1.00000 | 0.99863 | 0.13705 |
| 43.00 | 1.00000 | 0.99624 | 0.37638 | 88.00 | 1.00000 | 0.99939 | 0.06092 |
| 44.00 | 1.00000 | 1.00727 | -0.72750 | 89.00 | 1.00000 | 0.99985 | 0.01523 |

METHOD AND APPARATUS OF DEMODULATING SQUARE ROOT FOR PROCESSING DIGITAL SIGNALS

BACKGROUND OF THE INVENTION

1. Field of the Invention

The present invention relates to a method and apparatus for demodulating a square root. More particularly, the present invention relates to a method and apparatus used by a digital system or a signal communication system for demodulating a square root.

2. Description of the Related Art

In a very large scale integrated circuit (VLSI) digital system or a signal communication system, two input signals I and Q are often modulated into $\sqrt{I^2+Q^2}$. In other words, the input values I and Q are combined to form a square root of the sum of squares. To obtain an accurate value of the square root, lots of hardware is required. Moreover, the performance of hardware is usually poor and the processing time is usually long. Hence, hardware circuits are not too suitable for the real-time computation of square roots. To resolve this problem, methods and apparatus for finding an approximate solution such as the coordinate rotation digital computer (CORDIC), the angular cone approximate wave envelop inspection method and circuits and so on have been developed.

In Taiwan Patent No. 480.415, a square root demodulation apparatus is disclosed. In the invention, a coordinate slicing theory is utilized to obtain an approximate square root of two input signals I and Q. Although the patent is capable of resolving the aforementioned problems, too many comparators must be used to obtain the solution. Therefore, the required integrated circuit is large and its production cost is high.

FIG. 1 is a table listing the relation between angle and error ratio for the aforementioned Taiwan Patent No. 480.415. As shown in FIG. 1, the error ratios within some range of phase angles (the ones inside the circles) for the input signals I and Q are large. For example, the error ration when the angle is 76° is as high as 3.00303%. This error ratio is quire significant in a communication system or other digital computation system having a narrow tolerance for errors.

SUMMARY OF THE INVENTION

Accordingly, at least one objective of the present invention is to provide a method for demodulating a square root to provide an approximate square root with a very small error ratio.

At least a second objective of the present invention is to provide an apparatus having the simplest hardware structure for demodulating a square root to provide an approximate square root.

To achieve these and other advantages and in accordance with the purpose of the invention, as embodied and broadly described herein, the invention provides a method for demodulating a square root. The method utilizes a formula aX+bY to find an approximate square root solution of two input values I and Q. Here, X=|I|, Y=|Q|, and a and b are the coefficients of X and Y respectively. The method of demodulating the square root according to the present invention includes the following steps. First, define |arg e| to be the larger one between the absolute value of two input values I and Q and define |small| to be the smaller one between the absolute value of the two input values I and Q. Next, define a first determining form by a pair of inequalities. A|small|≦| arg e|≦B|small| and A| arg e|=B|small|. In addition, define a second determining form by another pair of inequalities A|small|≦A| arg e|≦B|small| and A| arg e|≠B|small|. Here, A and B are positive numbers. When the relation between || arg e| and |small| conforms to the first determining form, the approximate root-mean-square value of the two input values I and Q is || arg e|+2⁻⁵|| arg e|. When the relation between || arg e| and |small| conforms to the second determining form, the approximate root-mean-square value of the two input values I and Q is || arg e|+2⁻⁶|| arg e|.

The coefficient A and the coefficient B in the first determining form and the second determining form are 1 and 1.15 respectively. To simplify the hardware structure, the floating-point computation is converted to a fixed-point computation so that the value of coefficient A is set to 16 and the value of coefficient B is set to 18.

In addition, define a third determining form by a pair of inequalities C|small|≦D|| arg e|≦E|small| and F|small|≦D|| arg e|≦G|small|, and then define a fourth determining form by another pair of inequalities C|small|≦D|| arg e|≦E|small| and F|small|>D|| arg e|>G|small|. Here, C, D, E, F and G are positive constants. When the relation between || arg e| and |small| conforms to the third determining form, the approximate root-mean-square value of the two input values I and Q is ||large|+2⁻⁵|| arg e|. When the relation between || arg e| and |small| conforms to the fourth determining form, the approximate root-mean-square value of the two input values I and Q is || arg e|+2⁻⁶|| arg e|.

The values of the coefficients C, D, E, F and G in the third and the fourth determining form are 3.07, 1, 6.3, 3.48 and 4.7 respectively. Similarly, to simplify the hardware structure, the values of C, D, E, F and G are set to 12, 4, 25, 14 and 19 respectively.

Furthermore, when the relation between || arg e| and |small| does not conform to the first, the second, the third and the fourth determining form, a comparison formula ⅞|| arg e|+½|small|| is defined. Thereafter, the value of || arg e| is compared with the value found by the comparison formula. The larger one of the two is the approximate root-mean-square value of the input values I and Q.

The present invention also provides an apparatus for demodulating a square root. The apparatus comprises a compare absolute value circuit capable of receiving at least two input values I and Q. The compare absolute value circuit performs a comparison between the absolute value of the two input values I and Q to find the larger and the smaller value. The compare absolute value circuit also has a larger value output terminal and a smaller value output terminal. The larger value output terminal is used for outputting the larger one between the input values I and Q, also defined to be || arg e|. Similarly, the smaller value output terminal is used for outputting the smaller one between the input values I and Q, also defined to be |small|. The apparatus also comprises a multiplier for receiving the value sent from the larger value output terminal and the smaller value output terminal, multiplying the absolute value of I and Q by a plurality of pre-assigned values and then outputting the final value. The apparatus also comprises a compare/compensate circuit having a first input terminal, a second input terminal and a computation input terminal. The first input terminal is coupled to the larger value output terminal, the second input terminal is coupled to the smaller value output terminal and the computation input terminal is coupled to the output terminal of the multiplier. In addition, the compare/compensate circuit has an approximate value output terminal for outputting a signal having the approximate root-mean-square value of the two input values I and Q. When the multiplier outputs A|l arg e| and B|small| and the compare/compensate circuit discovers that the relation between the two conforms to a first determining form embodied in a pair of inequalities A|small|≦A|l arg e|≦B|small| and A|l arg e|=A|small|, the compare/compensate circuit outputs a signal having a value ||l arg e|+2⁻⁵||l arg e| from the approximate output terminal. Here, A and B are positive numbers. On the other hand, when the relation between A|l arg e| and B|small| conforms to a second determining form embodied in another pair of inequalities A|small|≦A|l arg e|≦B|small| and A|l arg e|≠A|small|, the compare/compensate circuit outputs a signal having a value ||l arg e|+2⁻⁶||l arg e| from the approximate output terminal.

In one embodiment of the present invention, the coefficient A and the coefficient B in the first determining form and the second determining form are 1 and 1.15 respectively. To simplify the hardware structure, the value of coefficient A is set to 16 and the value of coefficient B is set to 18.

When the multiplier outputs D|l arg e|, C|small|,F|small|, G|small| and the compare/compensate circuit discovers that the relation between them conforms to a third determining form embodied by a pair of inequalities C|small|≦D|l arg e|≦E|small| and F|small|≦D|l arg e|≦G|small|, where C, D, E, F and G are positive numbers, the compare/compensate circuit outputs a signal having a value ||l arg e|+2⁻⁵||l arg e| from the approximate output terminal. On the other hand, when D|l arg e|,C|small|,E|small|,F|small| and G|small| conforms to a fourth determining form embodied by another pair of inequalities C|small|≦D|l arg e|≦E|small| and F|small|≦D|l arg e|≦G|small|, the compare/compensate circuit outputs a signal having a value ||l arg e|+2⁻⁶||l arg e| from the approximate output terminal.

In one embodiment of the present invention, the values of the coefficients C, D, E, F and G in the third and the fourth determining form are 3.07, 1, 6.3, 3.48 and 4.7 respectively. Similarly, to simplify the hardware structure, the values of C, D, E, F and G are set to 12, 4, 25, 14 and 19 respectively.

In brief, the present invention provides fourth determining forms for deciding whether the input values I and Q fall within the range of angles having a large error ratio. If the input values I and Q do fall within the range of angles having a large error ratio, the present invention provides two approximate solutions to reduce the error ratio. Furthermore, only simple devices such as shifters, multipliers, and comparators are deployed to construct the apparatus for finding an approximate value to $\sqrt{I^2+Q^2}$. Hence, the cost of for producing the apparatus is reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a table listing the relation between angle and error ratio for the aforementioned Taiwan Patent No. 480.415.

FIG. 7 is a table listing the relation between angle and error ratio deploying the method according to the present invention.

DESCRIPTION OF THE PREFERRED EMBODIMENTS

Figure 2:
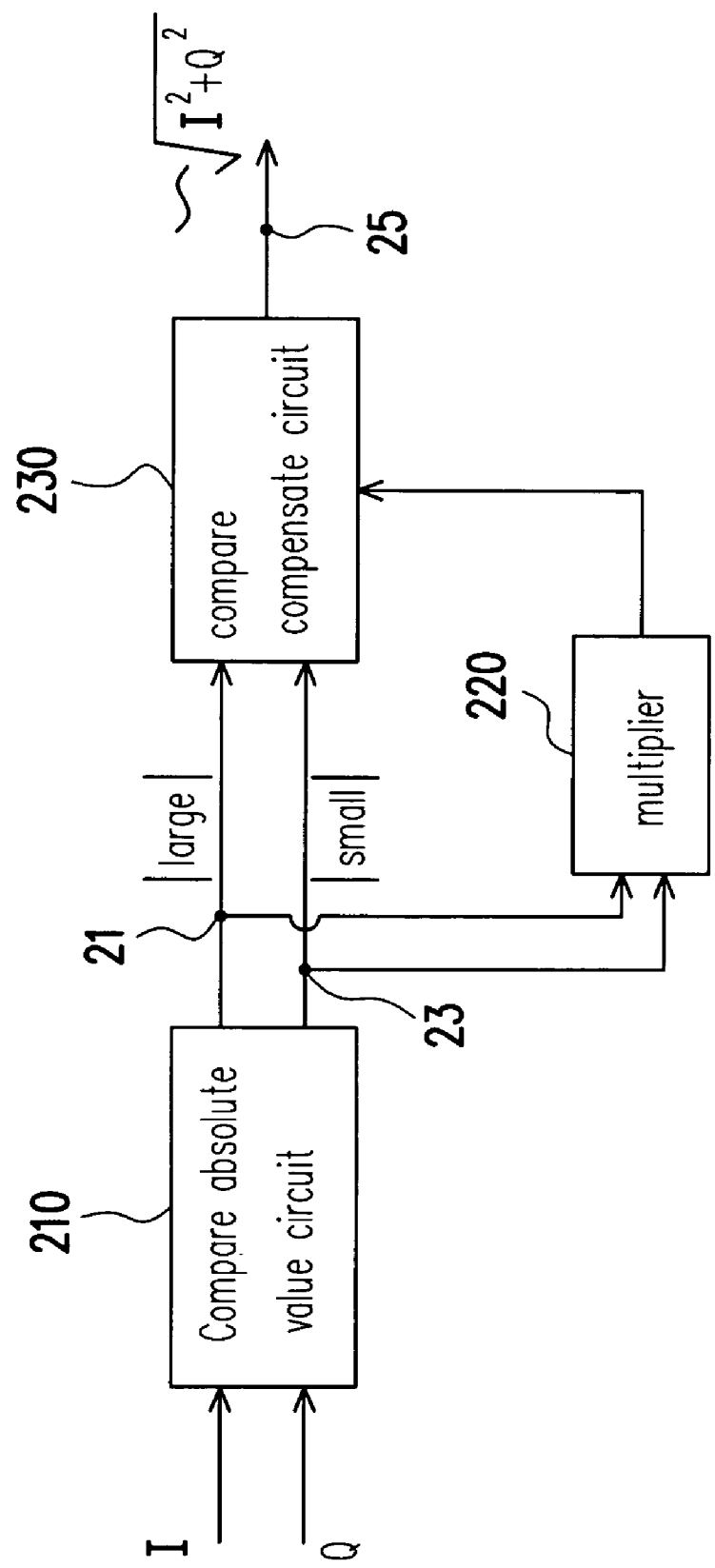
FIG. 2 is a block diagram showing the major components within an apparatus for demodulating a square root according to one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 2 is a block diagram showing the major components within an apparatus for demodulating a square root according to one preferred embodiment of the present invention. As shown in FIG. 2, the output terminals of the compare absolute value circuit 210 are coupled to a multiplier 220 and a compare/compensate circuit 230. The output terminal of the multiplier 220 is coupled to the compare/compensate circuit 230. The compare/compensate circuit 230 generates a signal having an approximate root-mean-square value $\sqrt{I^2+Q^2}$ of the input values I and Q according to the outputs from the compare absolute value circuit 210 and the multiplier 220.

The compare absolute value circuit 210 has a larger value output terminal 21 and a smaller value output terminal 23. After receiving the input values I and Q, the compare absolute value circuit 210 converts the input values I and Q into absolute values. Thereafter, the absolute values of I and Q are compared and the larger absolute value is defined as ||l arge | and output via the larger value output terminal 21 while the smaller absolute value is defined as |small| and output via the smaller value output terminal 23. The larger value output terminal 21 and the smaller value output terminal 23 are coupled to the multiplier 220 and the compare/compensate circuit 230. The output from the multiplier 220 is sent to the compare/compensate circuit 230. According to the outputs from the compare absolute value circuit 230 and the multiplier 220, the compare/compensate circuit 230 provides the signal having an approximate root-mean-square value $\sqrt{I^2+Q^2}$ of the input values I and Q through the approximate value output terminal 25.

Figure 3:
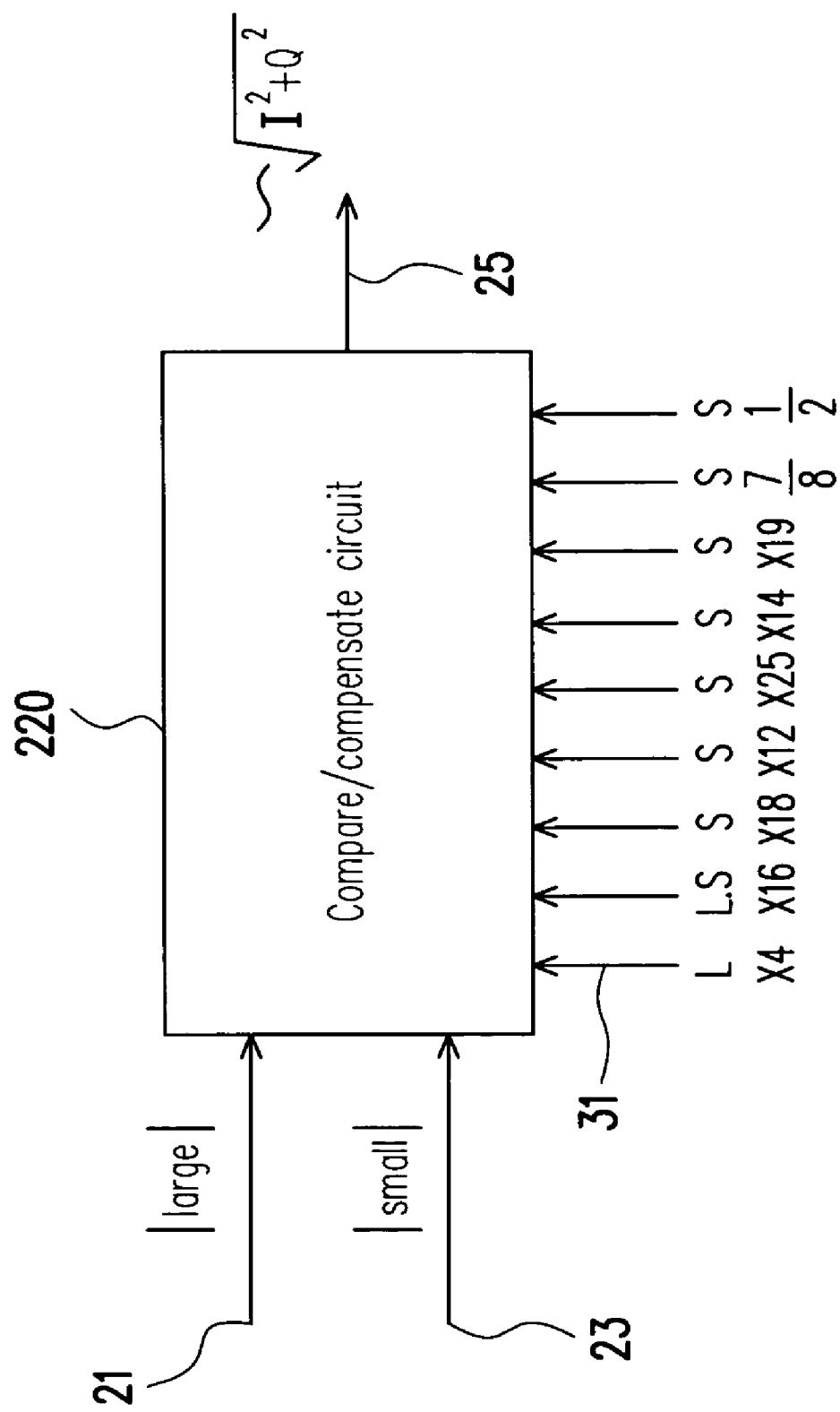
FIG. 3 is a block diagram showing the external connections of the compare/compensate circuit according to one preferred embodiment of the present invention.

FIG. 3 is a block diagram showing the external connections of the compare/compensate circuit according to one preferred embodiment of the present invention. As shown in FIG. 3, the compare/compensate circuit 230 has a plurality of computational input terminals 31. In the present embodiment, the computational input terminals 31 are connected to the output terminal of the multiplier 220, for example. In an alternative embodiment, the multiplier may have a plurality of multiplier output terminals coupled to the computational input terminals of the compare/compensate circuit. After receiver |l arg e| and |small| from the compare absolute value circuit 210, the multiplier 220 multiplies them with different assigned values before outputting to the computational input terminals of the compare/compensate circuit 230. For example, the value received by the computational input terminal 31 is four times |l arg e| or 4|l arg e|. According to the output from the larger value output terminal 21, the smaller value output terminal 23 and the value received at the computational input terminal, the compare/compensate circuit 220 outputs a signal having an approximate root-mean-square value $\sqrt{I^2+Q^2}$ of the input values I and Q to the approximate value output terminal 25.

Figure 4:
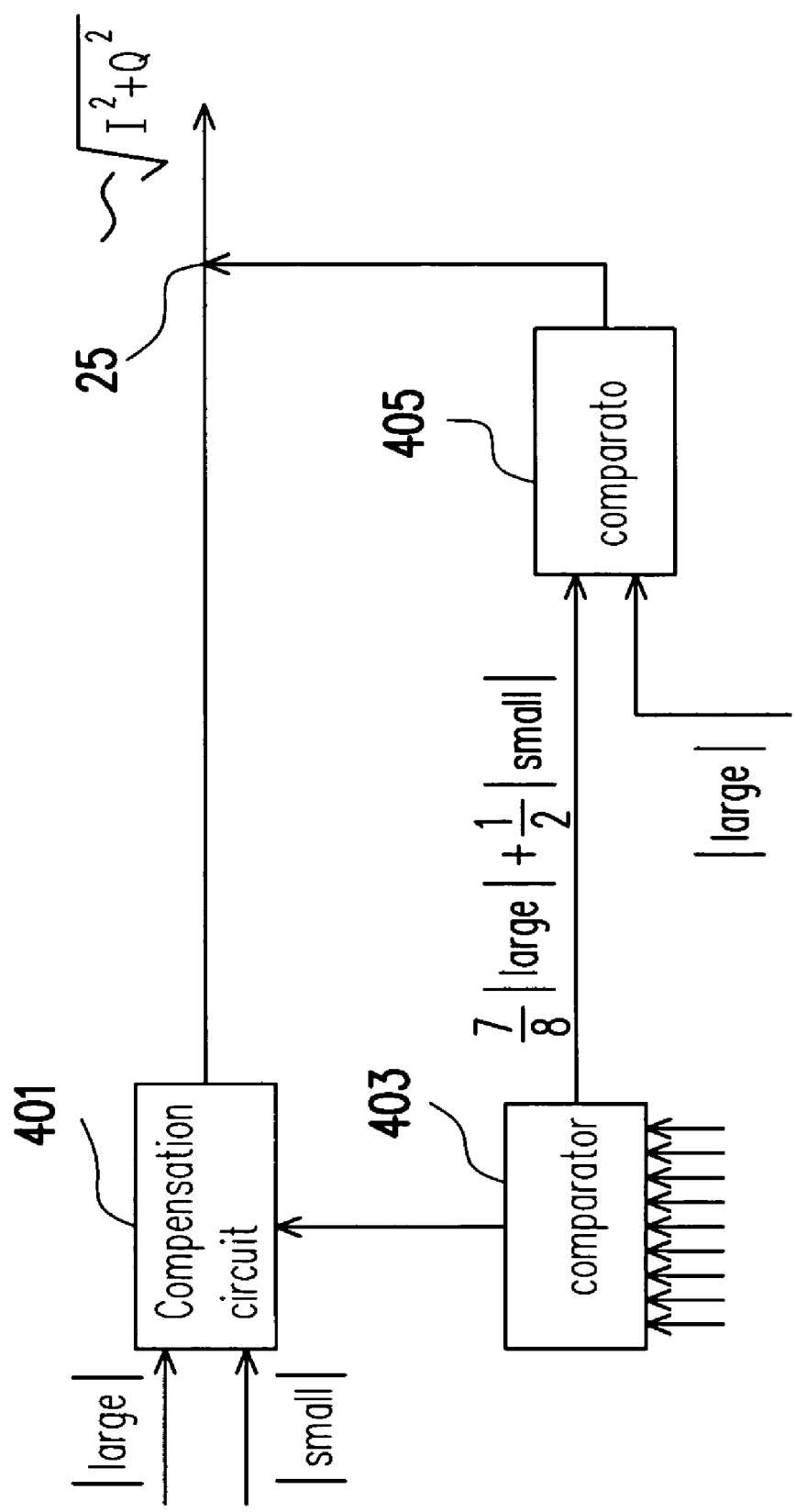
FIG. 4 is a block diagram showing the major components within the compare/compensate circuit according to one preferred embodiment of the present invention.

FIG. 4 is a block diagram showing the major components within the compare/compensate circuit according to one preferred embodiment of the present invention. The internal structure of the compare/compensate circuit as illustrated in FIG. 4 is just an example and should by no means limit the circuit as such. As shown in FIG. 4, all the computational input terminals of the compare/compensate circuit 230 are coupled to the comparator 403. The comparator 403 performs a comparison of all the values gathered by the computational input terminal. According to the results of the comparison, the compensation circuit 401 or the comparator 405 is triggered to output a signal having an approximate root-mean-square value $\sqrt{I^2+Q^2}$ of the input values I and Q to the approximate value output terminal 25.

Figure 5:
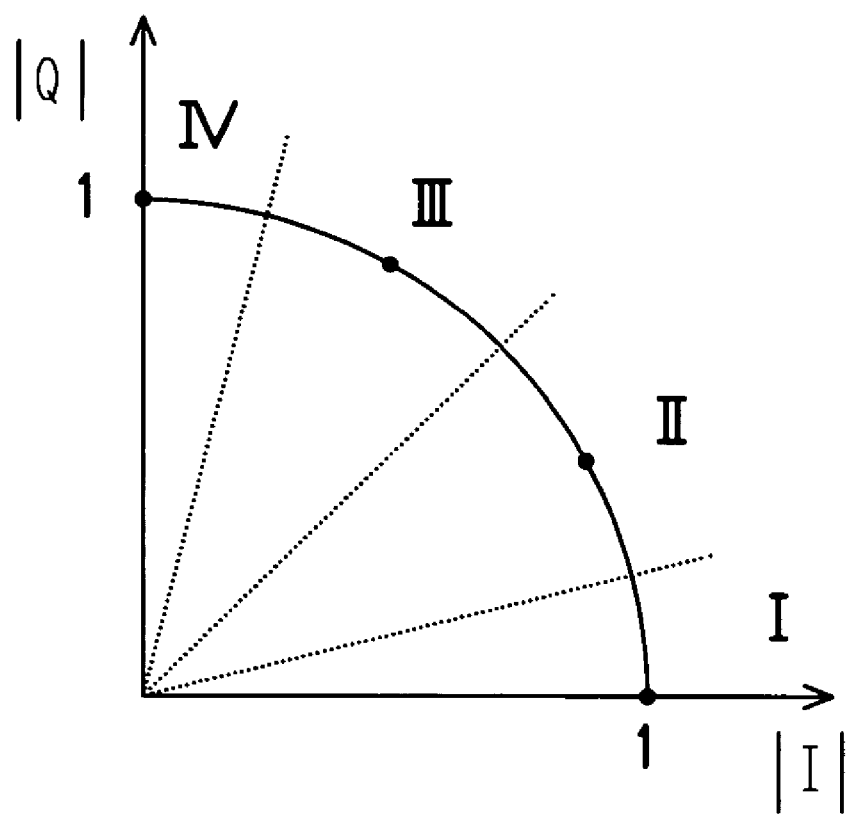
FIG. 5 is a graph showing the basic concept behind the method of demodulating a square root when the input values are I and Q.

FIG. 5 is a graph showing the basic concept behind the method of demodulating a square root when the input values are I and Q. As shown in FIG. 5, the solution of the root-mean-square value $\sqrt{I^2+Q^2}$ of the input values I and Q is approximated using the formula aX+bY. Here, X=|I|, Y=|Q| and a and b are the coefficients of X and Y. In the present invention, the right-angled rectangular coordinate axes |I| and |Q| is divided into four sectors. The first sector I occupies the angle between 0° and 14°, the second sector II occupies the angle between 14° to 45°, the third sector III occupies the angle between 45° to 76° and the fourth sector IV occupies the angle between 76° to 90°. The present invention provides four formulae to find the root-mean-square value $\sqrt{I^2+Q^2}$ of the input values I and Q, namely:

R1=|I|=R cos θ
R2=⅞|I|+½|Q|=R(⅞ cos θ+½ sin θ)
R3=½|I|+⅞|Q|=R(½ cos θ+⅞ sin θ)
R4=|Q|=R sin θ, where R1, R2, R3 and R4 are the approximate solution to the root-mean-square value $\sqrt{I^2+Q^2}$ within the sector I, II, III and IV and θ is the angle between the coordinate point (I,Q) and the origin (0,0).

In addition, the present invention also provide four determining forms as follows:

|small|≦|l arg e|≦1.15|small| and |l arg e|=|small|   (1)

|small|≦|l arg e|≦1.15|small| and |l arg e|≠|small|   (2)

3.07|small|≦|l arg e|≦6.3|small| and 3.48|small|≦|l arg e|≦4.7|small|   (3)

3.07|small|≦|l arg e|≦6.3|small| and 3.48|small|>4.7|small|   (4)

where the large one between |I| and |Q| is |l arg e| and the smaller one between |I| and |Q| is |small|. When the relation between |l arg e| and |small| conforms to inequalities (1) and (3), the approximate solution of the root-mean-square value $\sqrt{I^2+Q^2}$ is |l arg e|+$2^{-5}$|l arg e|. When the relation between |l arg e| and |small| conforms to inequalities (2) and (4), the approximate solution of the root-mean-square value $\sqrt{I^2+Q^2}$ and |l arg e|+$2^{-6}$|l arg e|.

Figure 6:
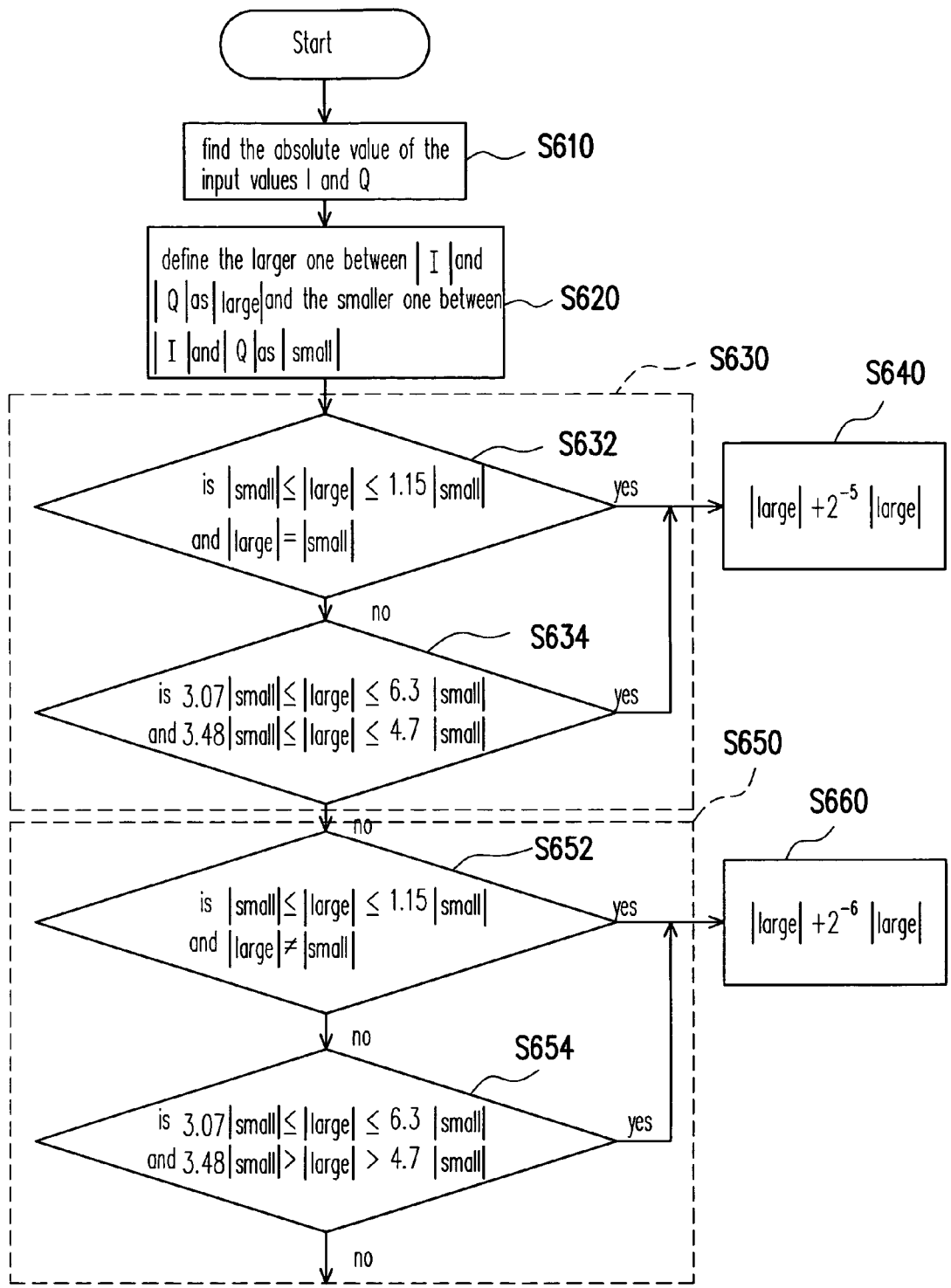
FIG. 6 is a flow diagram showing the steps in demodulating a square root according to one preferred embodiment of the present invention.

FIG. 6 is a flow diagram showing the steps in demodulating a square root according to one preferred embodiment of the present invention. As shown in FIGS. 2, 4 and 6, the compare absolute value circuit 210 finds the absolute values of the input values I and Q in step S610. The larger value between |I| and |Q| is defined as |l arg e| and the smaller value between |I| and |Q| is defined as |small| in step S620. Thereafter, |l arg e| and |small| are individually multiplied with different pre-assigned values and then transmitted to the comparator 403 for assessment in steps S630 and S650. Thus, either a signal having an approximate solution of the root-mean-square value $\sqrt{I^2+Q^2}$ of |l arg e|+$2^{-5}$|l arg e| is output from the compensation circuit 401 after compensating for |l arg e| and |small| in step S640 or a signal having a value |l arg e|+$2^{-6}$|l arg e| is output from the compensation circuit 401 after compensating for |l arg e| and |small| in step S660.

When the comparator 403 discovers that the output values from the multiplier 220 conforms to the determining forms (1) and (2) in steps S632 and S634, step S640 is executed. On the other hand, when the comparator 403 discovers that the output values from the multiplier 220 conforms to the determining forms (3) and (4) in steps S652 and S654, step S660 is executed.

Although the comparator 403 seems to inspect the relation between |l arg e| and |small| using the determining forms (1), (2), (3) and (4) in sequential order in the present embodiment, it is not. Anyone familiar with the technique knows that the comparator 430 may inspect the four determining forms (1), (2), (3), (4) in whatever sequence or together simultaneously without affecting the spirit of the present invention.

When the relation between |l arg e| and |small| does not conform to any one of the four determining forms, the comparator 403 outputs a signal having a value ⅞|l arg e|+½|small| to the comparator 405. The comparator 405 compares the value ⅞|l arg e|+½|small| with $\sqrt{I^2+Q^2}$ and outputs a signal having a value being the larger one as the approximate root-mean-square $\sqrt{I^2+Q^2}$ value.

To simplify the hardware structure of the present invention, the aforementioned four determining forms are modified as follows:

16|small|≦16|l arg e|≦18|small| and 16|l arg e|=16|small|   (1)

16|small|≦16|l arg e|≦18|small| and 16|l arg e|≠16|small|   (2)

12|small|≦4|l arg e|≦25|small| and 14|small|≦4|l arg e|≦19|small|   (3)

12|small|≦4|l arg e|≦25|small| and 14|small|>19|small|   (4)

The purpose of modifying the four determining forms is to convert a floating-point computation into a fixed decimal point computation so that the complexity of the hardware computational circuit is reduced.

FIG. 7 is a table listing the relation between angle and error ratio deploying the method according to the present invention. As shown in FIG. 7, the error ratio for the majority of angles is smaller than 1% and the largest error ratio does not exceed 1.1%.

In summary, the present invention utilizes the conversion of floating point computation into fixed decimal point computation to simplify the hardware circuit structure. Hence, only simple shifters, multipliers and comparators are required to find the approximate root-mean-square value $\sqrt{I^2+Q^2}$ of the input values I and Q. In this way, the demodulating speed is faster and the cost of the apparatus for demodulating square root is reduced. Furthermore, the setup of four determining forms in the present invention for finding the root-mean-square value substantially increases the accuracy of the solution.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of demodulating a square root for processing digital signals, suitable for finding an approximate root-mean-square value of a pair of input signals having values I and Q through a formula aX+bY such that X=|X|, Y=|Q| and a and b are the coefficients of X and Y, the method comprising the steps of:

defining the larger one of the absolute values |I| and |Q| to be |l arg e| and the smaller one of the absolute values |I| and |Q| to be |small|;

defining a first determining form A|small|≦A|l arg e|≦B|small| and A|l arg e|=A|small|, wherein A and B are positive numbers;

defining a second determining form A|small|≦A|l arg e|≦B|small| and A|l arg e|≠B|small|;

outputting a first signal having a value |l arg e|+$2^{-5}$|l arg e| as an approximate root-mean-square value for the input signals having values I and Q when the relation between |l arg e| and |small| conforms to the first determining form; and outputting a second signal having a value |l arg e|+$2^{-6}$|l arg e| as an approximate root-mean-square value for the input signals having values I and Q when the relation between |l arg e| and |small| conforms to the second determining form.

2. The method of claim 1, wherein he value of the coefficient A is 1 and the value of the coefficient B is 1.15 in the first determining form and the second determining form.

3. The method of claim 1, wherein the value of the coefficient A is 16 and the value of the coefficient B is 18 in the first determining form and the second determining form.

4. The method of claim 1, wherein the method further comprises the additional steps:

defining a third determining form C|small|≦D|l arg e|≦E|small| and F|small|≦D|l arg e|≦G|small|, wherein C, D, E, F and G are positive numbers;

defining a fourth determining form C|small|≦D|l arg e|≦E|small| and F|small|<D|l arg e|<G|small|;

outputting the first signal having the value |l arg e|+$2^{-5}$|l arg e| as an approximate root-mean-square value for the input signals having values I and Q when the relation between |l arg e| and |small| conforms to the third determining form; and outputting the second signal having the value |l arg e|+$2^{-6}$|l arg e| as an approximate root-mean-square value for the input signals having values I and Q when the relation between |l arg e| and |small| conforms to the fourth determining form.

5. The method of claim 4, wherein the value of the coefficient C is 3.07, the value of the coefficient D is 1, the value of the coefficient E is 6.3, the value of the coefficient F is 3.48 and the value of the coefficient G is 4.7 in the third determining form and the fourth determining form.

6. The method of claim 4, wherein the value of the coefficient C is 12, the value of the coefficient D is 4, the value of the coefficient E is 25, the value of the coefficient F is 14 and the value of the coefficient G is 19 in the third determining form and the fourth determining form.

7. The method of claim 4, wherein the following steps are carried out when the relation between |l arg e| and |small| does not conform to the first determining form, the second determining form, the third determining form or the fourth determining form:

defining a compare term ⅞|l arg e|+½|small|; and comparing |l arg e| and the compare term such that the larger one of the two is the approximate root-mean-square value of the input signals having values I and Q.

8. An apparatus for demodulating a square root for processing digital signals, comprising:

a compare absolute value circuit for receiving at least two input signals having values I and Q and comparing the absolute value of the input signals having values I and Q, wherein the compare absolute value circuit also have a larger value output terminal and a smaller value output terminal, the larger value output terminal outputs the larger one of the absolute value of the input signals having values I and Q defined as |l arg e| and the smaller value output terminal outputs the smaller one of the absolute value of the input signals having values I and Q defined as |small|;

a multiplier for receiving the value from the larger value output terminal and the smaller value output terminal so that the absolute values of the input signals having values I and Q multiply with a plurality of pre-assigned value and then outputting the results;

a compare/compensate circuit having a first input terminal, a second input terminal and a computational input terminal, wherein the first input terminal is coupled to the larger value output terminal, the second input terminal is coupled to the smaller value output terminal and the computational input terminal is coupled to receive the output from the multiplier, and the compare/compensate circuit further comprises an approximate value output terminal for outputting a signal having an approximate root-mean-square value of the two input signals having values I and Q, wherein if the multiplier outputs A|l arg e|, B|small| and the compare/compensate circuit discovers that the relation between the two conforms to a first determining form A|small|≦A|l arg e|≦b|small| and A|l arg e|=A|small| where A and B are positive numbers, the approximate output terminal of the compare/compensate circuit outputs the signal having a value |l arg e|+$2^{-5}$|l arg e|, and if the relation between A|l arg e| and B|small| conforms to a second determining form A|small|≦A|l arg e|≦B|small| and A|l arg e|≠B|small|, the approximate output terminal of the compare/compensate circuit outputs the signal having a value |l arg e|+$2^{-6}$|l arg e|.

9. The apparatus of claim 8, wherein the value of the coefficient A is 1 and the value of the coefficient B is 1.15 in the first determining form and the second determining form.

10. The apparatus of claim 9, wherein the multiplier further outputs $\frac{7}{8}|\arg e|$ and $\frac{1}{2}|small|$ to the compare/compensate circuit, and if the output value from the multiplier does not conform to the first determining form, the second determining form, the third determining form or the fourth determining form, the compare/compensate circuit outputs the signal having a value being the larger one between the $|\arg e|$ and $\frac{7}{8}|\arg e|+\frac{1}{2}|small|$ via the approximate value output terminal.

11. The apparatus of claim 9, wherein the compare/compensate circuit further comprises:
   a first comparator having a computational input terminal;
      a compensation circuit for receiving the output from the larger value output terminal and the smaller value output terminal, and if the first comparator discovers the output value from the multiplier conforms to the first determining form, the second determining form, the third determining form or the fourth determining form, the compensation circuit is instructed to output the signal having a corresponding value from the approximate value output terminal; and
      a second comparator coupled to the first comparator, and if the first comparator discovers that the output value from the multiplier does not conform to the first determining form, the second determining form, the third determining form or the fourth determining form, the second comparator compares the values between $|\arg e|$ and $\frac{7}{8}|\arg e|+\frac{1}{2}|small|$ and then outputs the signal having a value being the larger one from the approximate value output terminal.

12. The apparatus of claim 8, wherein the value of the coefficient A is 16 and the value of the coefficient B is 18 in the first determining form and the second determining form.

13. The apparatus of claim 8, wherein
   if the multiplier outputs $D|\arg e|$, $C|small|$, $E|small|$, $F|small|$ and $G|small|$ and the compare/compensate circuit discovers that the relation between them conforms to a third determining form $C|small| \leq D|\arg e| \leq E|small|$ and $F|small| \leq D|\arg e| \leq G|small|$ where C, D, E, F and G are positive numbers, the compare/compensate circuit outputs the signal having a value $|\arg e|+2^{-5}|\arg e|$ from the approximate output terminal, and
   if $D|\arg e|$, $C|small|$, $E|small|$, $F|small|$ and $G|small|$ conforms to a fourth determining form $C|small| \leq D|\arg e| \leq E|small|$ and $F|small| < D|\arg e| < G|small|$, the compare/compensate circuit outputs the signal having a value $|\arg e|+2^{-6}|\arg e|$ from the approximate output terminal.

14. The apparatus of claim 13, wherein the value of the coefficient C is 3.07, the value of the coefficient D is 1, the value of the coefficient E is 6.3, the value of the coefficient F is 3.48 and the value of the coefficient G is 4.7 in the third determining form and the fourth determining form.

15. The apparatus of claim 13, wherein the value of the coefficient C is 12, the value of the coefficient D is 4, the value of the coefficient E is 25, the value of the coefficient F is 14 and the value of the coefficient G is 19 in the third determining form and the fourth determining form.

* * * * *